Jan. 24, 1956

L. V. WHISTLER ET AL 2,732,015

PUNCH AND DIE ASSEMBLY

Filed Feb. 16, 1951

Lawrence V. Whistler
Sanford A. Whistler
} Inventors

By Emil Steinhart
Attorney.

Jan. 24, 1956

L. V. WHISTLER ET AL 2,732,015

PUNCH AND DIE ASSEMBLY

Filed Feb. 16, 1951

Lawrence V. Whistler
Sanford A. Whistler } Inventors

By Emil Kuehbach
Attorney.

Jan. 24, 1956  L. V. WHISTLER ET AL  2,732,015
PUNCH AND DIE ASSEMBLY
Filed Feb. 16, 1951  6 Sheets-Sheet 6

Lawrence V. Whistler
Sanford H. Whistler
Inventors
By Emil Steinhart
Attorney.

United States Patent Office 2,732,015
Patented Jan. 24, 1956

2,732,015

PUNCH AND DIE ASSEMBLY

Lawrence V. Whistler and Sanford A. Whistler, Tonawanda, N. Y., assignors, by direct and mesne assignments, of one-half to Lawrence V. Whistler and one-half to Lawrence V. Whistler, Jr., both of Tonawanda, N. Y.

Application February 16, 1951, Serial No. 211,206

5 Claims. (Cl. 164—94)

Our invention relates to a punch and die assembly, and more particularly to such an assembly in which, under a preferred method of use, unitary punch and die devices are positioned on a die shoe or other suitable support in accordance with a prepared template having openings therein, to punch openings or notches in a sheet metal or other work-piece in conformity with the locations and positions of the openings provided in the template, but which devices can also be used without being associated with a template, such as mentioned.

It is one of the objects of our invention to utilize a template provided with punch and die unit centering-openings and unit positioning-openings according to which both the centering and positioning of holes to be formed in a sheet metal or other work-piece is determined; also to aid in determining the direction or disposition of such last-mentioned openings when they are non-circular in shape.

Another object of our invention is to utilize a unitary punch and die device, or unitary perforating-device or unit as it may also be termed, in which the punch is maintained in axial alinement with its mating die and in which the die of each unitary perforating-unit is associated with locating or positioning-means, preferably in the form of a nub or boss on the device or unit adapted to enter or pass through a positioning-opening in the template, the said nub or boss being disposed with reference to the die-opening in a die that the unitary perforating-device may be positioned lengthwise, transversely, or at any angle in respect to the template, with a view of positioning any number of such perforating-units within a stamping or perforating press so that the centers of the openings to be stamped in a work-piece may be more closely arranged than has heretofore been possible.

Another object of our invention is to provide a unitary perforating-unit or device in which the punch and die are maintained in axial alinement and which is provided with positioning or locating means used in conjunction with the die to locate the device in any desired position to punch oval, rectangular and other irregular or odd-shaped holes in the work-piece with the length of the oval or other hole disposed at the desired angle with respect to one or more edges of the work-piece.

A further object of our invention is to prepare a template with two openings of different diameters to respectively receive into them a positioning or locating boss or nub of our improved unitary perforating unit and the die bushing of said unit, whereby the positioning of a perforating unit on a die shoe, preferably removable from the press, so as to enter the positioning or locating boss in one opening and the die or die bushing in the other opening will automatically position the unit on the die shoe so that any rectangular, oval or other non-circular hole to be punched in a work-piece will be in its desired position and trend in the desired direction.

A further object of our invention is to provide a punch and die assembly in which a prepared template is or can be positioned on a die shoe with the template supported on the die shoe in any approved manner in spaced relation thereto to enable perforating units having spaced-apart punch and die holding members to be positioned on the die shoe with one of said holding members above and the other beneath the template and to additionally support said template through the medium of template-supporting means located beneath one or more marginal portions of the template so that the template and perforating units can be assembled and retained in assembled condition preparatory to placing the whole assembly as a unit in the press, or so that the template may be positioned on the die-shoe and the perforating units then assembled to position the same with respect to the pattern openings in the template.

A further object of our invention is to provide the template with permanent gauges along two edges thereof, against which differently trending edges or portions of the stock to be perforated are placed and to further provide the template with stock-pushers adapted to engage one or more of the remaining edges of the stock or portions thereof to be perforated and force the stock into proper position to cause the same to be punched in exact accordance with the pattern openings in the template and with said pattern openings predetermined distances from said permanent gauges.

A still further object of our invention is to provide a punch and die assembly which includes a supported template having centering-openings and positioning-openings therein and in supporting said template in spaced relation to a die shoe, in association with perforating units comprising two spaced-apart holding members or arms disposed one above the other so as to trend in like directions and respectively hold a punch and a die in their free ends so that the die holding arm can be positioned between the template and the die shoe and when properly positioned aid in supporting the template; said die-supporting arm being provided with permanent magnets serving to retain the perforating units on the die shoe in a position to perforate sheet metal or other stock coaxially with respect to the punch and die of the perforating unit.

A still further object of our invention is to provide a unitary perforating unit with a permanent magnet or magnets adapted to cause it to self-adhere to a die shoe, yet permit adjustment under force of the unit planularly with respect to the surface of the die shoe so as to assure positioning of any odd shaped holes in a sheet of metal angularly with respect to the length or width of the die shoe and to enable the perforating unit or units, as the case may be, to be used with different templates having locating and positioning-openings therein, for forming holes in sheet metal or other stock with the holes punched in different relations to each other and at any angular positions with respect to the length or width of the template or the die-shoe.

A still further object is to provide a perforating unit having long spaced-apart holding-arms connected together at corresponding ends to form a unitary frame and whose other or free ends serve as punch and die-holding portions, the upper holding-portion of each perforating unit having a punch unit reciprocable therein comprising a punch-retainer of non-circular formation in cross-section with its major diameter trending in the general direction of said holding portion, and more particularly of the holding-arm of which said holding-portion forms part, and a punch entered thereinto from the bottom and held thereto by means of a set-screw; said set-screw being threaded to impinge against said punch and trending in the direction of the major axis of said punch-retainer and enabling said holding-portion to be reduced in width so as to enable perforating units to be more closely positioned on the die shoe and thus assure closer spacing of the holes to be punched in the sheet metal or other stock than has heretofore been possible.

A still further object of our invention is to provide a perforating unit comprising a die-holding arm and a punch-holding arm connected together at one end of the unit to provide a gap or throat between both arms to receive therein a template and a work-piece to be perforated; said punch-holding arm having a vertically reciprocating punch-retainer whose cross sectional formation is elongated and tapered from one end to the other with the ends thereof rounded, said punch-holding arm being provided with an opening formed to conform to the cross-sectional formation of said punch-retainer so as to receive the latter, a punch fitted into said punch-retainer from the bottom in closer relation to one end of the elongation thereof than the other to provide a comparatively large area at said other end of said punch retainer through which a securing or set-screw is passed to engage the punch and lock the same in said punch-retainer, thus enabling the punch-holding portion of the perforating-unit, and consequently the entire frame of said perforating unit, to be reduced in width so that another perforating unit can be placed in close proximity thereto and so that the holes formed in a sheet metal or other flat work-piece can be closely spaced apart.

With the above and other objects to appear hereinafter, our invention consists in certain devices, in the assembly of such devices, and in the construction, arrangement, and combination of parts to be hereinafter described and more particularly pointed out in the subjoined claims.

In the drawings.

Having reference to the drawings in detail, like numerals of reference refer to like parts in the several figures.

It is to be understood that this invention may be used in association with a die-set, but in the drawings we have illustrated a die-shoe designated by the numeral 40 which is placed upon the bed or bolster of a suitable stamping or perforating press and which may be removably secured thereto in any approved manner. The die-shoe is spaced a distance beneath a ram-plate 41 secured to the ram or other vertically-movable part of the press; the distance between the ram-plate and the die-shoe being sufficient to receive between them one or more of our improved perforating units, designated by the numeral 42.

Each of the perforating units, which may also be referred to as perforating devices so as to include unconnected parts fastened to relatively movably spaced-apart elements, in preferred form, includes a frame or body-portion comprising two spaced-apart arms 43, 44, connected together, in piece or otherwise, at corresponding ends to form a gap or throat 45 to receive a template and the work-piece or stock to be perforated, notched, or otherwise worked upon.

The spaced-apart arms overlie one another; the upper arm 43 serving as a punch-holding arm or member, while the lower arm which may also be considered as the base of the frame or body-portion, serving as the die-holding arm of our improved perforating unit, which may also be referred to as a die-holding element or member. By reason of the said arms being connected together at corresponding ends, each arm is provided with a free end or punch-holding portion and between the ends of the so spaced-apart arms the gap or throat 45 opens so as to enable a template and a work-piece to be partly entered into the gap or throat, as will be explained hereinafter.

Figures 26, 27, 28:
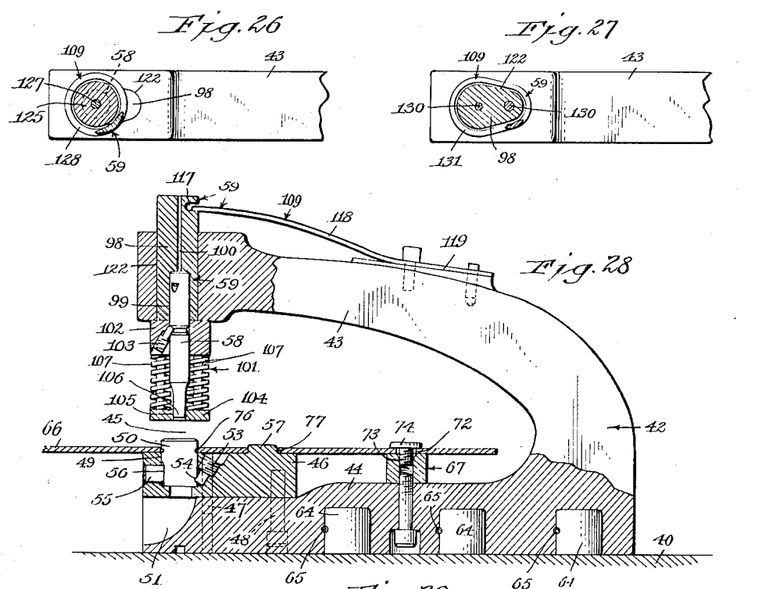
Fig. 26 is a section similar to Fig. 22, showing the transversely elongated punch-retainer, illustrated in Figs. 21–23, positioned in the punch-holding arm of a perforating unit with its major diameter parallel with the sides of said arm.
Fig. 27 is a view similar to Fig. 25, showing the punch-retainer in a different position within the punch-holding arm of the perforating unit.
Fig. 28 is a longitudinal vertical section through a perforating unit of further modified construction; the frame or body of the unit being shown partly in elevation as well as the return or retrieving-spring by means of which the punch unit is retained in normal position.

The die-holding arm or base of the frame or body-portion is flat-surfaced and is adapted to rest upon the upper flat surface of the die-shoe 40. The outer free end of the die-holding arm 44 has a die-retainer in the form of a rectangular block 46 mounted thereon; it being positioned by means of dowels 47 entering dowel holes in the die-holding arm and the die-retainer as illustrated in Fig. 28, and fastened by means of securing screws 48 passed through screw holes in said die-holding arm and threaded into the die-retainer. Any other suitable means of securing the die-retainer to the die-holding arm may, however, be employed.

Figure 29:
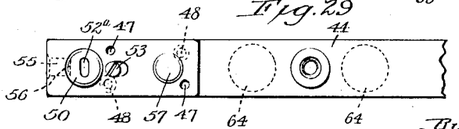
Fig. 29 is a top plan view of the lower die-holding arm or member of the frame or body portion of the perforating unit shown in Fig. 28.
Figure 37:
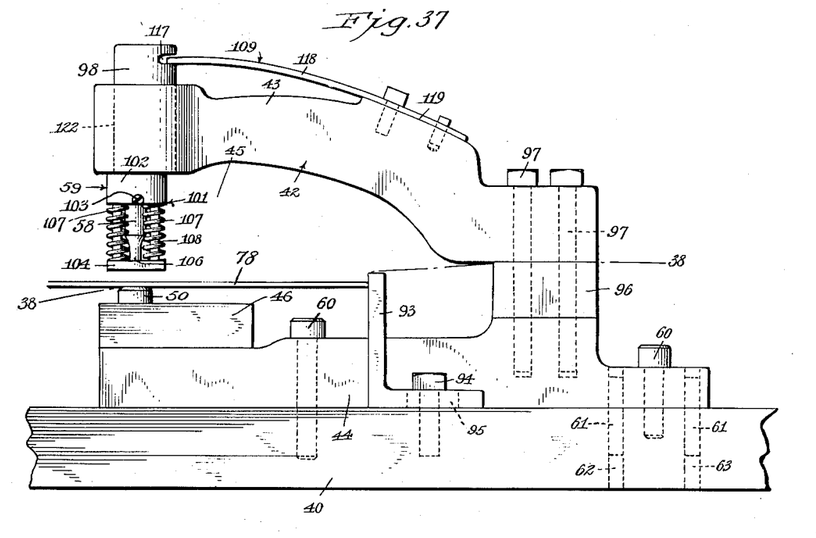
Fig. 37 is a side elevation of a further modified form of our invention.
Figure 38:
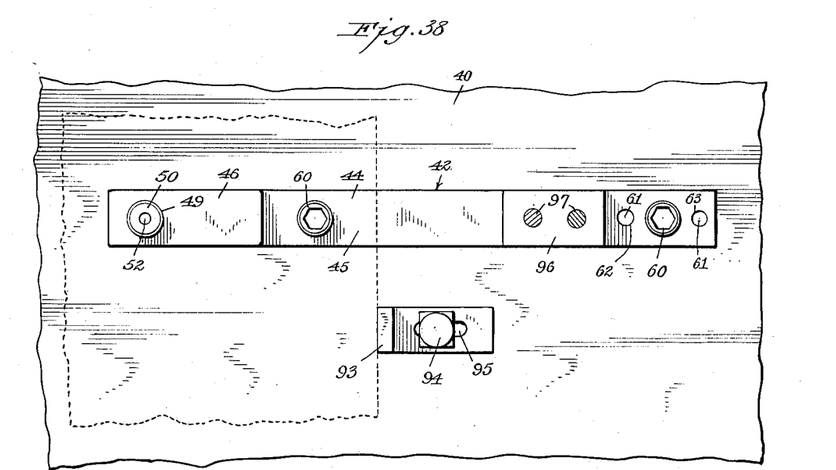
Fig. 38 is a plan view of the perforating unit shown in Fig. 37, showing the work-piece or stock illustrated in edge view in Fig. 37 shown in dotted lines in this figure.

The die-retainer, as shown in Figs. 29, 37 and 38, coincides in width with the width of the die-holding arm and is provided with a die-receiving socket 49, reduced in diameter to form an upwardly-facing shoulder against which a die-bushing 50 is seated, as shown in Fig. 28, said die-bushing being cylindrical and thrust into said socket from the upper side of the die-retainer. The reduced lower end of the socket 49 opens into a slug passage 51, which in turn is open at the outer end of the die-holding arm and is adapted to receive the slugs stamped from a sheet of metal or other work-piece, as is understood by those skilled in the art; the die-bushing having a punch-receiving opening 52 therethrough, which may open directly into the slug-receiving passage, or indirectly by means of the reduced lower portion of the die-receiving socket; both forms being illustrated in the drawings. The parts 46 and 50 form what we term a die unit.

The die-bushing is fastened within its socket by means of a set-screw 53 threaded diagonally into the die-retainer from the top and having its inner end engaging a notch 54 formed in the periphery of the die-bushing. In addition to the set-screw we find it of advantage to employ a lock plug 55 which is driven into the die-retainer and engages the die-bushing; this lock plug, in some instances, impinging against the normal peripheral surface of the die-bushing and in other instances against a flattened portion 56, or one of a plurality of such flattened portions formed exteriorly on the die-bushing, as will be more particularly pointed out hereinafter and the advantages of the latter construction set forth. The die-bushing projects upwardly above the upper flat surface of the die-retainer and this die-retainer also has what we term locating or positioning-means, in the form of a nub or boss 57 formed on its upper face.

Axially alined with the punch-receiving opening 52 is a punch 58 which forms part of a punch unit 59 reciprocally mounted in the outer or free end of the punch-holding arm 43 and which punch unit is adapted to be engaged by the ram-plate 41 when the ram or other movable part of the press to which said ram-plate is attached is moved toward the die-shoe 40.

It will be apparent, therefore, that the frame or body-portion of each perforating unit carries a die or die-bushing and a punch disposed coaxially with the die or die-bushing at all times, so that these three elements are movable as a unit and constitute with other parts, in one form of our invention, what we have hereinbefore referred to as a perforating unit or device.

Figure 17:
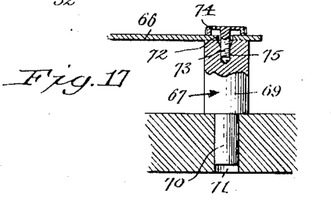
Fig. 17 is a view of one of the template supports or retainers shown mounted in the die shoe on which the perforating unit is or is to be mounted and clamped.
Figure 18:
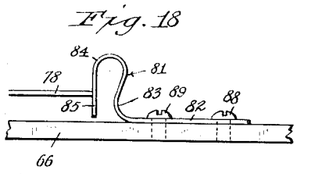
Fig. 18 is a side view of one of the stock or work-piece pushers secured to the template and showing one edge of the stock or work-piece engaging the pusher preparatory to placing the latter under tension.

As shown in Fig. 37, the perforating unit may be secured to the die-shoe by means of fastening bolts 60 after having positioned the perforating unit on the shoe in the desired location by means of dowel-pins 61 forced into dowel-pin openings 62, 63, formed respectively in the frame or body portion of the perforating unit and in the die-shoe; but as a new and novel punch and die assembly possessing highly essential advantages, we embody in each of the perforating units means to magnetically retain the units on the die-shoe without the use of extraneous fastening devices. For this purpose the frame or body-portion is cored out or bored into upwardly from its underside and receives within it one or more permanent magnets 64 which are fastened in place by means of pins 65, or otherwise. These permanent magnets may be comparatively small and placed at spaced-apart regions of the frame or body-portion and when confronting or brought in contact with the die-shoe, cause the perforating units to effectively adhere to said shoe so that when once properly positioned they will retain such position under all working conditions. The magnets, however, permit adjusting of the perforating units planularly over the face of the die-shoe so that the units may be adjusted by sliding the same over the face of the die-shoe under pressure exerted against the unit in any direction parallel with the face of the die-shoe. It is, however, an advantage of our invention to utilize these perforating units in conjunction with a template positioned over the die-shoe, such for example as shown at 66, and held elevated therefrom by means of template supports 67 which may be of the type shown in Fig. 17, or otherwise. Each of these template supports comprises a post or body portion 69 having a stud 70 extending axially from its lower end entered into a correspondingly sized opening 71 in the die-shoe.

The template rests upon the upper flat ends of these supports and it has an opening 72 therethrough through which a screw stud 73 extending axially from the underside of a turn button 74 is passed; said screw stud being threaded into a threaded bore 75 formed axially in the template support. Thus upon tightening said turn button the template will be securely fastened to any desired number of template supports; said supports having their upper faces in horizontal alinement with the upper face of the die-retainer 46, as clearly shown in Fig. 28.

Figure 1:
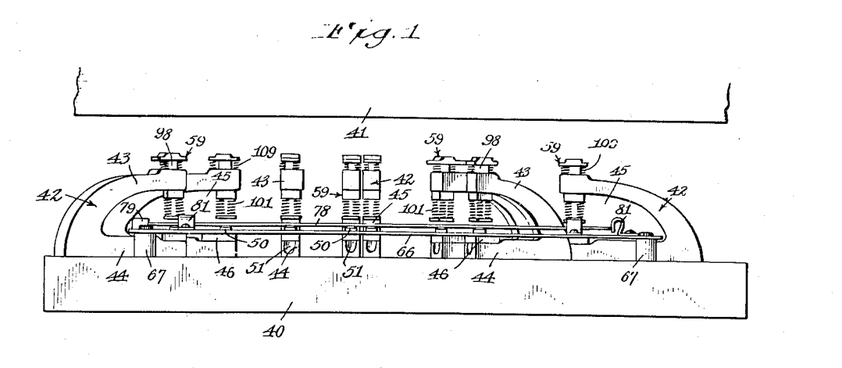
Fig. 1 is a front elevation of a die shoe forming part of or adapted to be removably positioned within a power press designed for perforating sheet metal or other flat material, in association with a ram plate which may form part of the press or be attached thereto.

These template supports, which may also be termed template clamping posts may be used at the front corners of the template only to hold the latter elevated and the template is otherwise held elevated from the die-shoe by the die-holding arms 44 of the perforating units; said arms being positioned under the template and by reason of the die-retainers thereof being in the plane of the upper end faces of the template supports or clamping posts, the template is held in level condition without strain being applied thereto, as clearly shown in Fig. 1.

When punching non-circular holes in a work-piece, the template is provided with centering-openings 76 and locating or positioning-openings 77, the axes of the centering-openings determining the axes of the holes or notches, as the case may be, to be punched in the stock or work-piece 78, and as the perforating units are slid onto the die-shoe, the die-bushings 50 are positioned so that they extend through the centering-openings 76 and the positioning nubs or bosses 57 extend through the positioning-openings 77. This positions the perforating units planularly in the desired positions on the die-shoe and this is of extreme importance when the holes or notches to be punched in the work-piece are irregular or non-circular. Inasmuch as the positions of the perforating units with respect to the work-piece determine the angular positions which the holes or notches in the latter are to have when non-circular and the manner in which the punches and dies are rotatably positioned within the perforating units are determined in the manner hereinafter explained and as particularly set out in our Patent No. 2,371,565, the holes punched in a work-piece will be accurately centered in addition to being angularly positioned with reference to one or more edges of the work-piece or certain regions thereof. The cylindrical dies 50 therefore serve as pivots on which the perforating units or devices are arranged or hinged for rotative movement.

Figure 2:
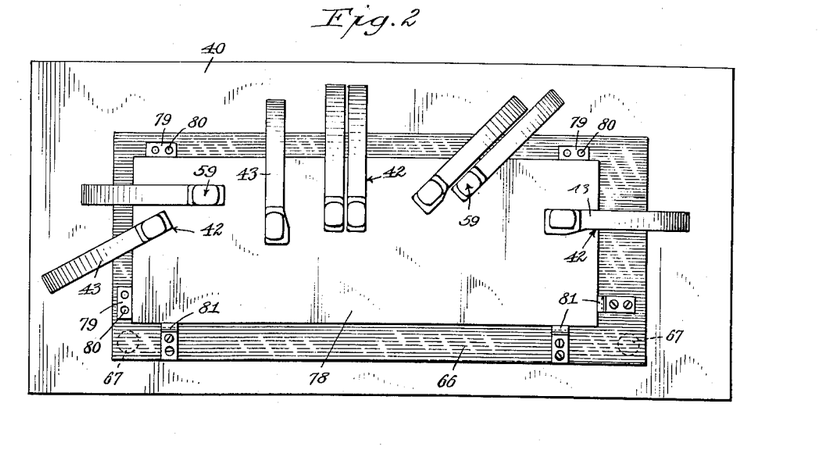
Fig. 2 is a top plan view of the die shoe, the template supported thereon, a plurality of perforating units constructed in accordance with our invention and disposed as shown in Fig. 1 so as to straddle or receive within them portions of a template supported by said die shoe and by means of portions of the perforating units and showing also a work-piece, such as a sheet of metal or similar flat material, adapted to be perforated in accordance with centering and positioning means provided in the formation or construction of the template.
Figure 19:
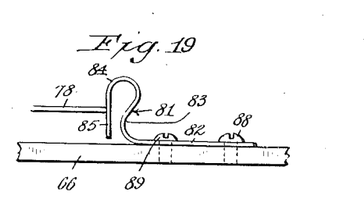
Fig. 19 is a similar view showing the pusher under tension to hold the work-piece firmly in position.
Figure 20:
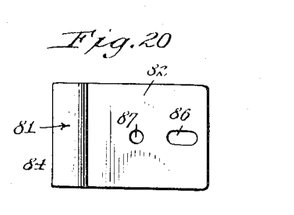
Fig. 20 is a plan view of one of the pushers.

The position of the work-piece with respect to the template is of importance and for this reason the template has permanent gauges 79 secured to their upper faces, these gauges being in the form of metallic blocks which are secured to the template by means of rivets 80 or otherwise and as clearly shown in Fig. 2, these permanent gauges are arranged along two adjacent edges of the template. The work-piece is designed to have corresponding edges thereof abut against said permanent gauges and it is being positioned thereagainst by means of what we term stock-pushers or positioners 81 which are arranged at the remaining edges of the template. Each stock-pusher or positioner is formed of a strip of resilient steel bent to provide a flat fastening portion 82 curved upwardly at one end, as at 83, and thence recurved, as at 84, so as to form a downwardly-directed terminal or spring-tongue 85. The flat fastening portion 82 is provided with a screw-slot 86 and a screw hole 87, through both of which fastening screws 88, 89 are passed, the slot 86 permitting adjustment of the stock-pusher 81 on the template preparatory to tightening the screws 88, 89. The end of the downwardly-directed terminal or spring-tongue 85 is spaced from the upper surface of the template so that when bringing the edge of a work-piece against the same while positioning it between the punches and dies of the perforating units, it will flex said spring tongue in the manner shown in Fig. 19, and in the act of exerting its force against the work-piece will move the latter firmly against the permanent gauges 79, thereby accurately positioning the work-piece in the punch and die assembly and assuring precision punching or perforating of the work-piece in exact accordance with the openings in the template and in exact relation to the edges of the work-piece.

It will, therefore, be understood that when the template is positioned on the die-shoe and the perforating or notching units, as the case may be, are positioned with respect to the template and serve also to support the latter, the punch and die assembly is in condition to operate upon work-pieces. The work-pieces for each punch and die assembly are of uniform outline and are placed in the gaps or throats 45 of the perforating units so that adjacent edges abut against the permanent gauges 79 and the remaining edges engage the spring tongues 85 of the pushers or positioners 81. Upon downward pressure of the work-piece while so engaging said pushers or positioners, said spring tongues are flexed, thereby enabling the work-piece to rest upon the die bushings 50. When in such position, the work-piece is ready to be punched and/or notched, depending on the positions of the punches and dies of a perforating device or perforating devices with respect to the edges of the work-piece.

The perforating devices are positioned so that they preferably straddle the template from the sides and rear only, thus facilitating the positioning of the work-piece with respect to the permanent gauges and the pusher devices engaged thereby. This is possible, due to the fact that we provide the perforating units with deep gaps or throats so that the template and work-piece may extend considerable distances into the perforating units and thus upon adjusting the latter from two or three sides of the assembly, the punch and die of each perforating unit may be adjusted to any point over the entire area of the work-piece and the template with which they are associated. The gap in some perforating units may therefore be much longer or deeper than shown in the drawings.

Where the perforating units are employed without permanent magnets and they are fastened to the die-shoe, as for example hereinbefore set out in respect to Fig. 37, the perforating units are positioned on the die-shoe, on which their location and disposition is fixed by the dowel pin openings 62, 63 and the dowel pins 61 entered therein, said openings being formed in the die-shoe parallel with the longitudinal or end edges of the latter or at an angle to either of said edges, depending on the angular position which the perforating unit is to have with respect to one or the other of the edges of the die-shoe, and in some cases the relation of the perforating unit with respect to other perforating units applied to the die-shoe. When so used a template is not found necessary but permanent gauges 93 are employed which are fastened to the upper face of the die-shoe by means of bolts 94 passed through slots 95 in the gauges, the latter being therefore adjustable and being preferably employed so that adjacent edges of a work-piece engage them when the work-piece is entered into the gaps or throats 45 of the perforating units and rests on the die-bushings of the latter.

In most figures of the drawings we have shown the frame or body-portion of each perforating unit formed integral, while in Fig. 37 a unitary structure is provided for the body-portion by making the punch-holding arm 43 and the die-holding arm 44 as separate parts and interposing a spacing member 96 between corresponding ends of the two and connecting the three parts thus provided together by means of bolts 97.

The punch unit 59 in each instance illustrated in the several modifications comprises a reciprocable punch-retainer 98 provided with a vertical downwardly-opening bore 99 into which the punch 58 is inserted from its lower end and to assure firm contact of the inner end of the punch with the end wall of said bore, an air vent 100 is formed in the punch-retainer and extends from the bore upwardly to open to atmospheric air, either at the end or side of the retainer.

Secured to the lower end of the punch-retainer is a stripper device 101 comprising a header 102 fastened to the punch by means of a set screw 103 or otherwise and normally bearing against the punch-holding arm 43, thus limiting the upward movement of the punch and punch-retainer, and a stripper plate 104 having an opening 105 therein to receive the punch end or terminal 106 of the punch 58. Interposed between the lower end of the header 102 and the stripper plate 104 is a series of spiral springs 107 through each of which a guide rod 108 is passed which is secured in any approved manner to the stripper plate 104 and is slidably arranged in the header in any manner capable of preventing the stripper device from becoming detached from the header 102. The stripper device, as clearly shown in Figs. 1, 4, 7 and 10, in no instance extends beyond the sides of the frame or body portion of the perforating unit and its limits are at all times and under all conditions within the side boundary lines of the punch-holding arm or member of the perforating unit or device, regardless of the transverse extent of said arm or member.

Figure 4:
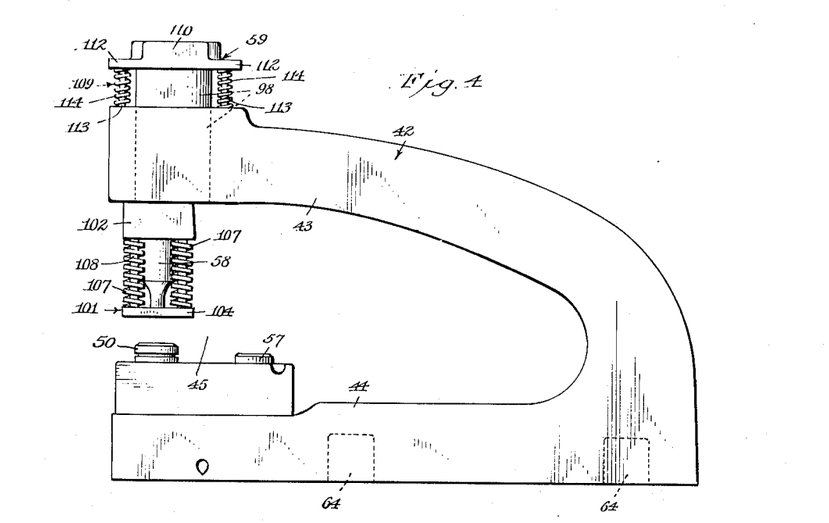
Fig. 4 is a side elevation of our improved perforating unit in the form we now consider most suitable for the purpose intended.
Figure 5:
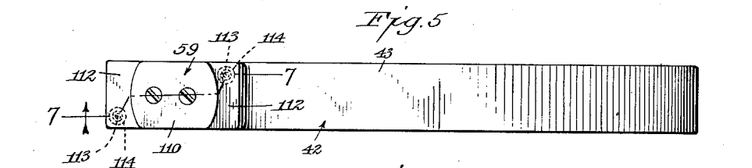
Fig. 5 is a top plan view of the same.
Figure 6:
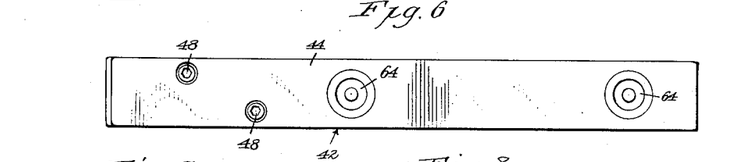
Fig. 6 is a bottom plan view of said perforating unit.
Figures 7, 8, 9, 10:
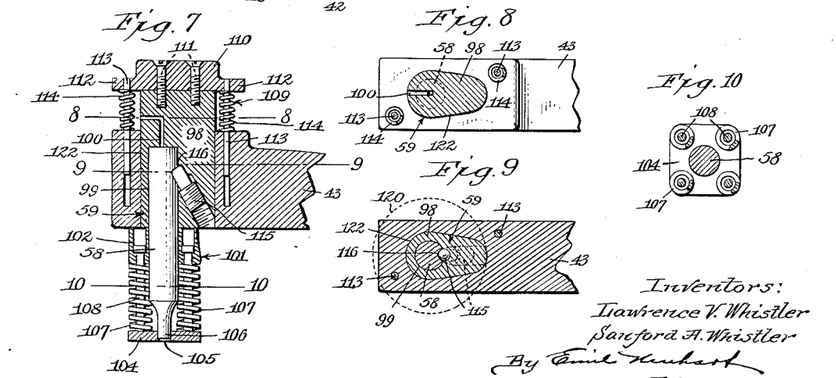
Fig. 7 is a vertical section through the punch unit and the punch-holding arm in which the punch unit is reciprocally arranged; the section being taken on line 7—7, Fig. 5, looking in the direction of the arrow crossing said line.
Fig. 8 is a horizontal section taken on line 8—8, Fig. 7.
Fig. 9 is a horizontal section taken on line 9—9, Fig. 7.
Fig. 10 is a horizontal section taken on line 10—10, Fig. 7.
Figures 11, 12:
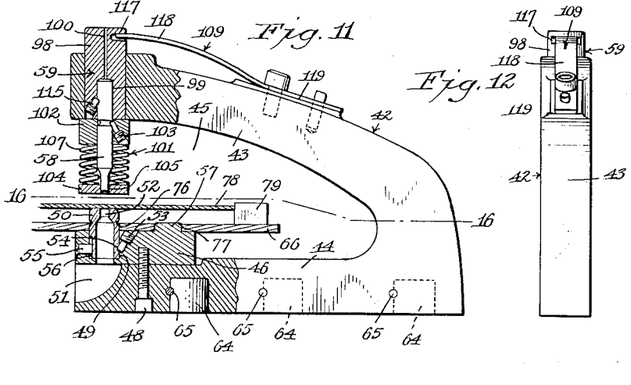
Fig. 11 is a sectional side elevation of a unitary perforating unit of modified construction, showing the manner in which perforating units constructed according to this invention, regardless of their modifications, are associated with a template to axially locate or center the punch and die thereof and to position the perforating unit so that holes or notches may be punched in a work-piece in accordance with openings or notches formed in the associated template.
Fig. 12 is a view of one end of the perforating unit shown in Fig. 11.
Figure 13:
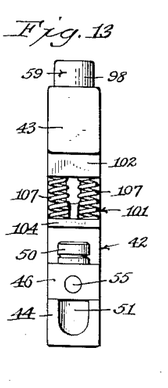
Fig. 13 is a view of the other end thereof.
Figure 14:
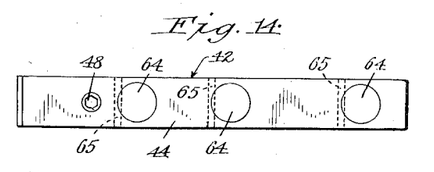
Fig. 14 is a bottom plan view thereof.
Figure 15:
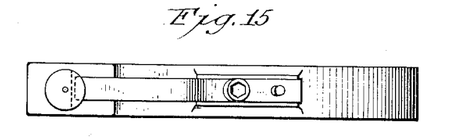
Fig. 15 is a top plan view thereof.
Figure 16:
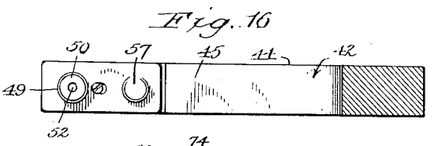
Fig. 16 is a horizontal section taken on line 16—16, Fig. 11, the work-piece and template shown in Fig. 11 being omitted.

We also provide the punch-retainer with a retrieving device 109, whereby upon the perforating operation being completed, the punch-retainer and its punch is returned to normal position, and for this purpose we secure a cap 110 to the upper end of the punch-retainer 98 by means of screws 111 passed through the cap from the top and threaded into the punch-retainer, the cap having portions or flanges 112 overhanging the same. In these overhanging portions or flanges guide-rods 113 are secured which are slidable in the portion of the punch-holding arm 43 immediately surrounding the punch-retainer. Between the upper side of said punch-holding arm and the overhanging portions or flanges 112 of the cap 110, punch retrieving means in the form of springs 114 are arranged which surround the guide rods 113. An accepted and commonly used method of securing punches in their punch-retainers involves the use of a set-screw 115 which is threaded into an obliquely arranged screw threaded opening formed in the punch-retainer and extending from the bottom of the latter upwardly to the bore in said punch-retainer into which the punch 58 is inserted, the set-screw having a reduced unthreaded inner portion which is adapted to engage a notch 116 formed in the side of the punch so as to fasten the punch securely within the punch-retainer; the set screw 115 being easily accessible so that it may be unthreaded to disengage the same from the punch and permit the insertion of a different punch adapted to punch larger or smaller openings in a work-piece, or oval or other non-circular holes. While the retrieving means provided for the perforating devices shown in Figs. 4, 7, and 10 is the preferred construction, such punch-retrieving means may be otherwise provided; for example, such as shown in Figs. 28 and 37 in which the cap 110 previously described is dispensed with and a laterally-opening notch 117 provided in the upper end of the punch-retainer into which the free end of a flat or leaf spring 118 is inserted, the opposite end of said spring being secured to the punch-holding arm 43 between its ends, as at 119.

We desire to point out that this invention is designed to punch holes in work-pieces in more closely spaced relation than has heretofore been possible and this we accomplish by reducing the width of the frame or body-portion of the perforating unit. As hereinbefore constructed and as used over a period of many years, the punch-retainer has been made cylindrical and the punch axially inserted therein. This necessitated the use of a punch-holding arm of a width greater than the diameter of the inner dotted circle 120 shown in Figs. 30 and 32 and at least as great as the diameter of the outer dotted circle 121 shown in said figures in order that the surrounding portion of the punch-holding arm may serve as a means to guide a punch-retainer in its vertical movement; such dimensions being necessitated due to the fact that a sufficient area of metal is required to provide a screw-threaded opening in the punch-retainer to receive the setscrew 115 when fastening the punch to the punch-retainer in the manner illustrated in Fig. 7.

Constructed in accordance with this invention, the outer end of the punch-holding arm is reduced in width compared to the method now employed and under certain conditions even this narrowed outer end is further narrowed inwardly a short distance from its outer end and this further reduced width thus formed is continued rearwardly along the curved or connecting portion of the frame or body portion of the perforating unit and forwardly throughout the length of the die-holding arm or base member on which the die retainer 46 is secured.

Our improved punch-retainer is elongated in transverse section, as clearly shown in Figs. 30, 32, 33, 34 and other figures of the drawings. This punch-retainer is tapered transversely from one end to the other and has its ends rounded and the passage or opening 122 formed in the outer or free end of the punch-holding arm is correspondingly shaped for sliding movement of the punch-retainer therein, as shown in the drawings. The bore 99 formed in the punch-retainer has its axis coincident with the axis of the rounded large end of said punch-retainer while the portion between said bore and the small rounded end of said punch-retainer provides a metal area in which the threaded opening for the set-screw 115 is formed, thus enabling said set screw to be threaded into said opening so that the reduced inner end thereof engages the notch 116 in the punch and securely fastens the latter within the punch-holder or retainer.

Figure 30:
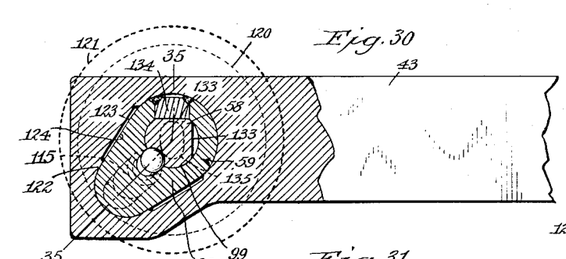
Fig. 30 is a horizontal section through the punch-holding arm of a perforating device constructed according to our invention, wherein the punch is provided with flattened areas at its inserted end, with one or more of said flattened portions determining the rotative position of a non-circular punch end of said punch.
Figures 32, 33, 34, 36:
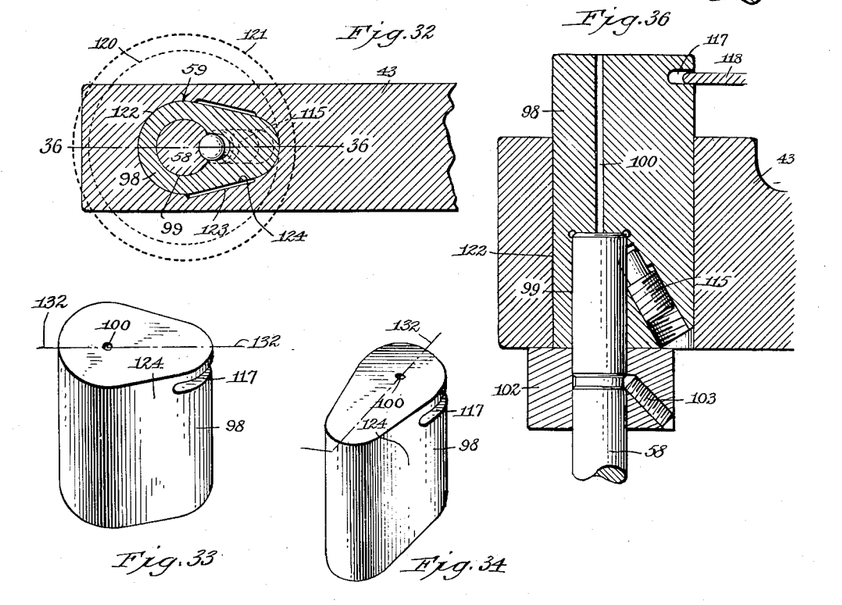
Fig. 32 is a view similar to Fig. 30 with the punch-retainer in a different position than shown in Fig. 30 to enable the punch-holding member or arm in which said punch-retainer is reciprocally mounted to be reduced in width.
Figs. 33 and 34 are detached perspective views of the punch-retainer shown in Figs. 11, 28 and 36, viewed from different angles.
Fig. 36 is a vertical section taken on line 36—36, Fig. 32; the return or retrieving spring being in the form illustrated in Figs. 11, 12, 15 and 28.
Figure 35:
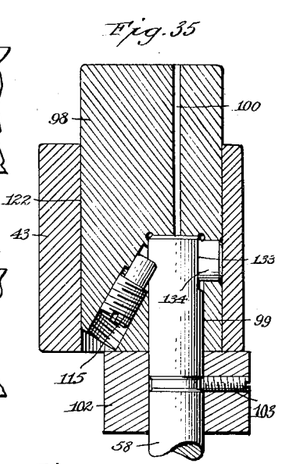
Fig. 35 is a vertical section taken on line 35—35, Fig. 30.

It is to be noted in Figs. 30 and 32 that the area occupied by the punch-retainer is extremely small compared to the area of the cross-sectional formation of the punch-retainer now employed and illustrated by the dotted line 120 in Figs. 30 and 32 and that the width of the punch-holding arm is considerably less than used in perforating units in which the punch-retainer is cylindrical in cross section.

The transversely elongated opening in the punch-holding arm is preferably formed by boring through the arm from the top downwardly, or reversely, on spaced-apart centers conforming to the rounding of the punch-retainer and then broaching or casting out the sides so that a space 123 of approximately one sixty-fourth of an inch is provided between the flat side portions 124 of the punch-retainer and the confronting sides of the passage or opening 122 in the punch-holding arm.

It will thus be seen that by transversely elongating the punch-retainer and fitting the same slidably into a punch-holding arm of a perforating unit with the major axis of the punch-retainer parallel with the sides of the frame or body-portion of the perforating unit, as shown in Fig. 32, or at an angle to said sides as shown in Fig. 30, or otherwise, the frame or body-portion of the perforating unit is reduced in width to a considerable degree and, therefore, when placing the perforating units side by side, as shown in Figs. 1 and 2, the punches and dies of adjacent perforating units will be more closely spaced apart than when using perforating units in which the punch-retainer is formed cylindrical, as now constructed.

When using a transversely-elonagted punch-retainer, the punch is entered thereinto and fastened in place closer to one end of the elongation than the other so that the stripper-device secured to the punch, as well as the punch itself, is secured to the punch-retainer off center and thus a portion of the punch-retainer overhangs the stripper-device as clearly shown in Fig. 7; thus providing free access to the set screw or fastening screw 115 by means of which the punch is held to the punch-retainer. This enables the punch to be easily unfastened from the punch-retainer and another punch and stripper to be substituted therefor, or the stripper device may be removed with the punch and applied to a replacing punch and the latter fastened securely in place.

As clearly shown in Figs. 4 and 7 the header of the stripper-device 101 abuts against the underside of the punch-holding arm 43 and thus prevents the punch-retainer from moving upwardly under force exerted by the spiral retrieving springs 114, although these springs may be so tensioned that they are fully expanded as the header of the stripper-device 101 engages the bottom of the punch-holding arm 43, in which case there would be no tendency on the part of the punch-retainer to move upwardly in the holding arm beyond its normal position, in which position the lower end of said punch-retainer is flush with the underside of said punch-holding arm at the region in which said punch-retainer is slidably arranged.

Where our invention is used to punch circular holes in a work-piece, it is only necessary that the exact center of the hole to be punched is determined by the positioning of the perforating unit on the die-shoe in any position available and according to the pattern openings in the template and this does not require that the die-retainer 46 have the locating nub 57 thereon.

Figure 21:
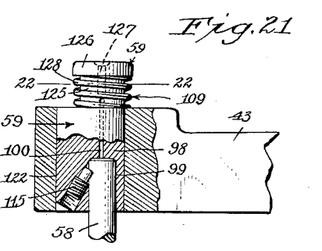
Fig. 21 is a sectional side view of the punch-holding arm or member of a perforating unit showing the punch unit therein in further modified form.

As shown in the modification of our invention illustrated in Fig. 21, only that portion of the punch-retainer slidable in the punch-holding arm need be elongated transversely and in said last-mentioned figure, the punch-retainer is provided with an upstanding cylindrical boss 125 whose axis is coincident with the axis of the punch and it has secured thereto a disk or cap 126 by means of a screw 127 passed through said cap and threaded axially into said boss. The cap 126 is enlarged in diameter to overhang the boss 125 and surrounding said boss between said cap and the upper face of the punch-holding arm in which the punch-retainer is slidably fitted is a spiral spring 128 serving to retain the punch holder, the punch secured thereto and the stripper device secured to the punch in elevated position.

Figure 24:
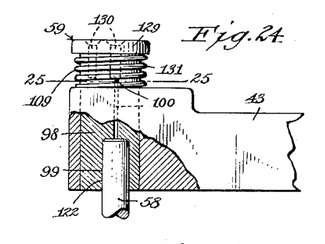
Fig. 24 is a similar view showing the punch unit further modified in form.
Figure 25:
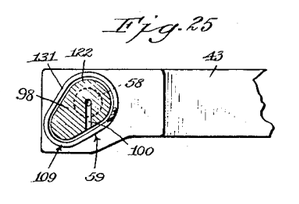
Fig. 25 is a horizontal section taken on line 25—25, Fig. 24.

In the modification shown in Figs. 24 and 25 the transversely-elongated punch-retainer is of a length so that its upper portion extends upwardly above the upper face of the punch-holding arm 43 and secured to the upper face of said punch retainer is a cap 129 outlined to conform to the transversely-elongated punch-retainer so as to overhang the latter, the cap being secured to the punch-retainer by means of screws 130. Surrounding the upwardly-projecting portion of the punch-retainer between said cap and the upper face of the punch-holding arm 43 is a transversely-elongated spiral spring 131 shaped to conform to the cross-sectional formation of the punch-retainer and serving to keep the latter and parts carried thereby in elevated position.

Figure 22:
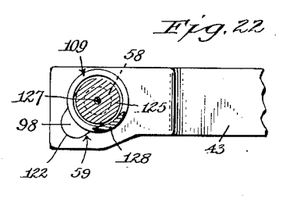
Fig. 22 is a horizontal section taken on line 22—22, Fig. 21, the punch-retainer having its major axis disposed obliquely to the sides of the punch-holding arm in which it is reciprocally mounted.
Figure 23:
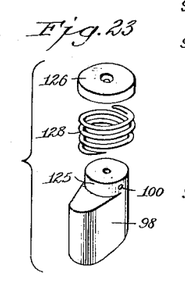
Fig. 23 is a view showing the parts of the punch-retainer illustrated in Fig. 21 disassembled.

It is to be noted that the transversely-elongated punch-retainer may have its major axis, indicated by the broken lines 132 in Figs. 33 and 34 arranged parallel with the sides of the punch-holding arm, as shown in Figs. 26 and 27, either in the modified form of punch retainer shown in Figs. 21, 22 and 23 wherein the transversely elongated portion of the punch-retainer is reduced in length and provided with a cylindrical upstanding boss, or in the form in which the upper portion of the transversely elongated punch-retainer is extended above the punch-holding arms, as shown in Fig. 27, and when so employed, the fastening or set-screw 115 by means of which the punch is fastened in the punch-retainer has sufficient metal at one side of the axis of the punch to enable the screw to be passed therethrough as effectively as though the punch holder or retainer were made cylindrical and of a diameter indicated by the dotted circle 120 shown in Figs. 30 and 32, which latter construction is in accordance with present day perforating units employing fastening means embodying the use of such fastening or set-screws. Where the punch-retainer is capped, as shown in Figs. 21, 23 and 24, the air vent 100 may be made to open to atmospheric air at the side of the punch-retainer.

Figure 3:
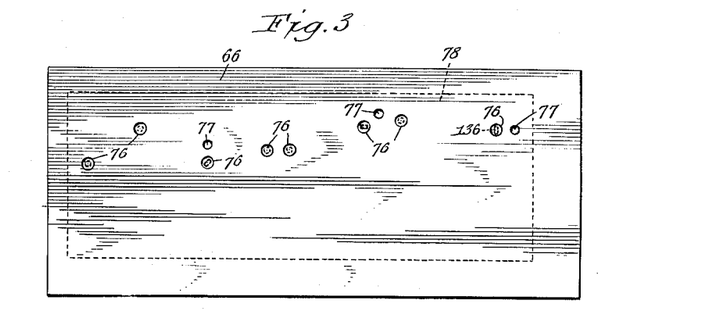
Fig. 3 is a top plan view of the template showing the positioning-openings therein, and in dotted lines the position of the work-sheet in relation thereto and the location and disposition of the holes to be formed in the work-sheet axially with respect to the centering-openings in the template; also the relation of said centering-openings to the positioning-openings.
Figure 31:
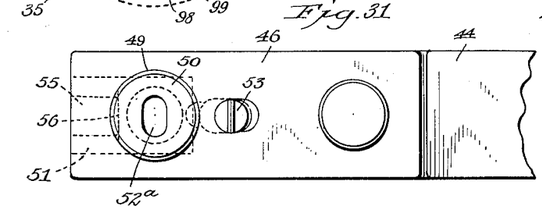
Fig. 31 is a top plan view of the die-holding member or arm serving as the base of the frame or body portion of a perforating unit and illustrating the position of the punch hole in the die to correspond with the position of the punch end shown in Fig. 30.

In cases where the punch is constructed to punch oval or other non-circular or irregular holes in the work-piece, the rotative or angular positioning of the punch within the punch-retainer is of importance and in such instances we provide the punch at its secured end with flattened surfaces 133, in accordance with our aforesaid Patent No. 2,371,565. In such cases we utilize one or more of such flattened surfaces with retainer devices, such as plugs, set screws or other elements entered into suitable receiving openings in the punch-retainer and bearing against one or more of the flattened surfaces thereof; a plug 134 being shown for this purpose in Fig. 30 of the drawings bearing against one of said flattened surfaces and welded in place; the punch having a transversely elongated punch end or terminal, indicated by the dotted lines 135 in said figure and adapted to enter the correspondingly shaped and positioned punch-receiving opening 52ª in a mating die or die bushing shown, for example, in Fig. 31. The transversely elongated punch end or terminal of the punch is therefore disposed at a right-angle to the length of the frame or body-portion of the perforating unit and particularly of the punch-holding arm thereof, and assuming that an elongated hole were to be punched in a work-piece at a right-angle to the length of the work-piece, as illustrated by the dotted lines 136 within a circle at the right-hand end in Fig. 3, the perforating unit would be positioned to receive the work-piece and the template when the perforating unit is positioned parallel with the front edge of the template. Under such conditions, the centering-opening 76 and the positioning-opening 77 in the template adapted to respectively receive the die bushing 50 and the positioning nub or boss 57 of the perforating unit are alined parallel with the front edge of the template so that the punch and its mating die, when in the position shown in Figs. 30 and 31, will punch an elongated hole in the work-piece in the position indicated by said dotted lines 136.

As clearly shown in Fig. 30, the punch is provided with flat surfaces arranged at right angles to each other and a retainer plug 134 is engaged with one of said flat surfaces. Were the punch rotated ninety degrees toward the left, the other flat surface of the punch would confront the opening designed to receive said retainer plug and the transversely elongated punch end or terminal of the punch, indicated by the dotted lines 135, would be disposed parallel with the sides of the punch-holding arm and such positioning of said punch end or terminal would result when using the frame or body-portion of the perforating unit in the position last described. Therefore the rotative position of a punch designed to punch non-circular or other irregular shaped holes in a work-piece used in association with positioning means, such as a die-bushing, and with locating means, such as the positioning nub or boss 57, determines the exact position angularly or other placement of the hole to be punched in the work-piece upon operation of the perforating unit.

While we prefer to employ punches and dies having flattened portions for rotatively positioning them and holding them by fastening means in any rotative position, any other means to determine the rotative position of the punch within its punch-retainer may be employed and the rotative position of the punch and the corresponding rotative position of the die bushing may be determined by any other means without departing from that feature of our invention which involves the centering and locating means furnished by the use of a projecting die or die-bushing adapted to enter a correspondingly-formed opening in a template and a locating element associated with the die or die-bushing also adapted to coact with an opening or part formed in or on the template in a predetermined relation to the die or die-bushing.

Although we have hereinbefore referred to the manner of assembling the various parts of the punch and die assembly in the press by positioning the template on the die-shoe and then applying the perforating units to the template in positions conforming to the centering-openings 76 and positioning-openings 77 in the template, we find it of advantage at times to assemble the various parts before inserting them into the press and this we accomplish by assembling the perforating units on a flat supporting member, non-magnetic when using the magnetic type of perforating unit shown in several of the figures of the drawings, in approximately their relative positions of use and placing the template into the gaps or throats of the various perforating units, after which the latter are moved angularly or otherwise to position each perforating unit on said flat member in accordance with cooperating centering and positioning openings in the template. In this manner we assemble the parts in the exact positions in which they are to be used in the press and in this assembled form in which both the perforating units and the template are supported by the flat supporting member, the latter with the units and the template are positioned in the press by gradually sliding the various parts of the punch and die assembly from the flat supporting member onto the die-shoe, after which the template is fastened to the die-shoe in the manner stated so as to enable the workpieces to be punched to be positioned in the press preparatory to the punching operation in accordance with the permanent gauges 79 provided on the template.

By the term "non-circular hole" as herein used we mean a hole which is square, rectangular, irregular with angles or a slot; in fact, any hole whose confining wall is not truly circular; and by the term "planularly" we have reference to the plane of the die-shoe of a die set or a similar bed member or to a plane parallel with the face of the die-shoe or bed member. From the foregoing it will be apparent that each centering opening in the template has a companion locating or positioning opening and that the die bushings 50 projecting upwardly from the die-holding member of each perforating unit serves as a pivot or center on which the perforating unit may be rotatably moved to perforate a work-piece exactly as the pattern provided by the template, including the angular positions of any holes or openings which are non-circular in formation.

Having thus described our invention, what we claim is:

1. A unitary perforating unit, comprising an elongated frame or body having a punch-holding arm and a die-holding arm connected together at one end to form a long work-receiving throat between the two, a die-bushing removably fastened in said die-holding arm, said punch-holding arm having an elongated opening at its outer or free end with opposite ends thereof rounded on spaced-apart centers, a punch-retainer vertically movable in said elongated opening and having a cross sectional formation conforming substantially to the outline of said opening, said punch-retainer having a downwardly-opening bore coaxial with the center of the rounded portion of said opening at one end thereof, a punch removably entered in said bore, a fastening screw threaded into said punch-retainer from the bottom near its other end and engaging said punch to removably hold the same in place, a stripper-device secured to said punch and having at least a portion thereof in contact with the underside of said punch-holding arm, spring means to hold said punch-retainer elevated and said stripper device against the bottom of said punch-holding arm and thereby keep said punch properly spaced from said die to enable a work-piece to be passed between the two and entered the desired distance into said work-receiving throat, said punch-retainer being depressible against the action of said spring means.

2. A perforating device comprising an elongated punch-holding element adapted for use in a punch press in association with other punch-holding elements and having a transversely elongated opening therein, the major axis of said elongated opening being disposed at an angle to a plane extending transversely through said element, said element being reduced in width to a dimension less than the length of said opening, opposite ends of said elongated opening being rounded and formed of different diameters with the walls thereof merging into straight lined sides for said opening which converge toward the smaller diameter thereof, a punch-retainer reciprocable in said opening and having a cross sectional formation substantially conforming to the outline of said opening to provide a semi-circular large end for the transverse elongation of said punch-retainer and a semi-circular small opposite end therefor, said punch-retainer having a downwardly opening bore whose axis is coincident with the axis of the large transverse end of said punch-retainer so that a wide metallic area is provided between said bore and the small semi-circular end of said retainer, said wide metallic area having a screw-threaded opening formed therein and obliquely extending from the bottom thereof to said bore, a fastening screw threaded into said threaded opening from the bottom of said area and engaging said punch to removably fasten the same in said punch-retainer, the reduced portion of said punch-holding element permitting a second punch-holding element to be arranged in close proximity to said first-mentioned punch-holding element so that the axis of the punch of said second punch-holding element may be closely spaced with reference to the axis of said first-mentioned punch-holding element.

3. In a perforating device, an elongated punch-holding element having an opening therein elongated transversely, the major axis of said opening being at an angle to a plane passing transversely through said punch-holding element, a punch-retainer having contact normally with the underside of said punch-holding element and having an operating sliding fit within said opening and a downwardly-opening bore formed therein whose axis is to one side of the center in the transverse length of said elongated retainer so as to provide a wide metal area at one side of said bore, a punch entered in said bore from the bottom of said retainer, said retainer having a screw-threaded opening extending obliquely through said wide metal area from the bottom thereof to said bore, and a set-screw in said screw-threaded opening having its inner end in locking engagement with said punch to removably hold the same within said retainer, said set-screw being accessible from the bottom of said retainer.

4. A unitary perforating unit comprising an elongated frame or body having a punch-holding arm and a die-holding arm spaced apart and connected together at one end to form a long work-receiving throat between the two; a cylindrical die-bushing removably fastened in said die-holding arm, said punch-holding arm having an elongated opening at its outer or free end, an elongated punch-retainer slidably movable in said elongated opening, said punch-retainer having a downwardly opening bore at one end thereof, a punch removably entered in said bore, a fastening screw threaded into said punch retainer from the bottom at its other end and engaging said punch to removably hold the same in place, a stripper device secured to said punch and having at least a portion thereof in contact with the underside of said punch-holding arm, spring means to hold said punch retainer elevated and said stripper device against the bottom of said punch-holding arm and thereby keep said punch properly spaced from said die to enable a work-piece to be passed between the two and entered the desired distance in the said work-receiving throat, said punch retainer being depressible against the action of said spring means.

5. A perforating device, comprising an elongated punch-holding element adapted for use in a punch press in association with other punch-holding elements and having an elongated opening therein disposed at an angle to a plane extending transversely through said punch-holding element, the latter being reduced in width to a dimension less than the length of said opening, a punch retainer reciprocable in said opening and having a cross sectional formation substantially conforming to the outline of said opening, said punch retainer having a downwardly opening punch-receiving bore, one end of said punch-retainer having a screw-threaded opening formed therein extending obliquely from the bottom thereof to said bore, a fastening screw threaded into said screw-threaded opening from the bottom of said punch retainer and engaging said punch to removably fasten the same in said punch retainer, the reduced portion of said punch-holding element permitting a second punch-holding element to be arranged in close proximity to said first-mentioned punch-holding element so that the axis of the punch of said second punch-holding element may be closely spaced with reference to the axis of said first-mentioned punch-holding element.

(References on following page)

References Cited in the file of this patent

UNITED STATES PATENTS

| Number | Name | Date |
|---|---|---|
| 829,267 | Graham | Aug. 21, 1906 |
| 877,879 | Ash | Jan. 28, 1908 |
| 1,499,309 | Ramsey | June 24, 1924 |
| 1,955,866 | Wales | Apr. 24, 1934 |
| 2,184,356 | Lindgren | Dec. 26, 1939 |
| 2,205,731 | Olsen | June 25, 1940 |
| 2,326,588 | Wales | Aug. 10, 1943 |
| 2,340,805 | Garberding | Feb. 1, 1944 |
| 2,364,733 | McCollum | Dec. 12, 1944 |
| 2,364,834 | Whistler et al. | Dec. 12, 1944 |
| 2,372,499 | Kerner | Mar. 27, 1945 |
| 2,373,844 | Norsen | Apr. 17, 1945 |
| 2,378,603 | Wales | June 19, 1945 |
| 2,427,409 | Kirsch | Sept. 16, 1947 |

FOREIGN PATENTS

| Number | Country | Date |
|---|---|---|
| 508,737 | France | Aug. 2, 1920 |